Aug. 28, 1951  A. A. BERESTNEFF  2,565,943
ABSORPTION REFRIGERATION SYSTEM
Filed July 13, 1946  8 Sheets-Sheet 1

INVENTOR.
Alexis A. Berestneff
BY

Aug. 28, 1951

A. A. BERESTNEFF 2,565,943

ABSORPTION REFRIGERATION SYSTEM

Filed July 13, 1946

INVENTOR.
Alexis A. Berestneff
BY

Aug. 28, 1951 A. A. BERESTNEFF 2,565,943
ABSORPTION REFRIGERATION SYSTEM
Filed July 13, 1946 8 Sheets-Sheet 3

INVENTOR.
Alexis A. Berestneff
BY

Aug. 28, 1951 A. A. BERESTNEFF 2,565,943
ABSORPTION REFRIGERATION SYSTEM
Filed July 13, 1946 8 Sheets-Sheet 4

INVENTOR.
Alexis A. Berestneff
BY

Aug. 28, 1951     A. A. BERESTNEFF     2,565,943
ABSORPTION REFRIGERATION SYSTEM

Filed July 13, 1946     8 Sheets-Sheet 5

INVENTOR.
Alexis A. Berestneff
BY

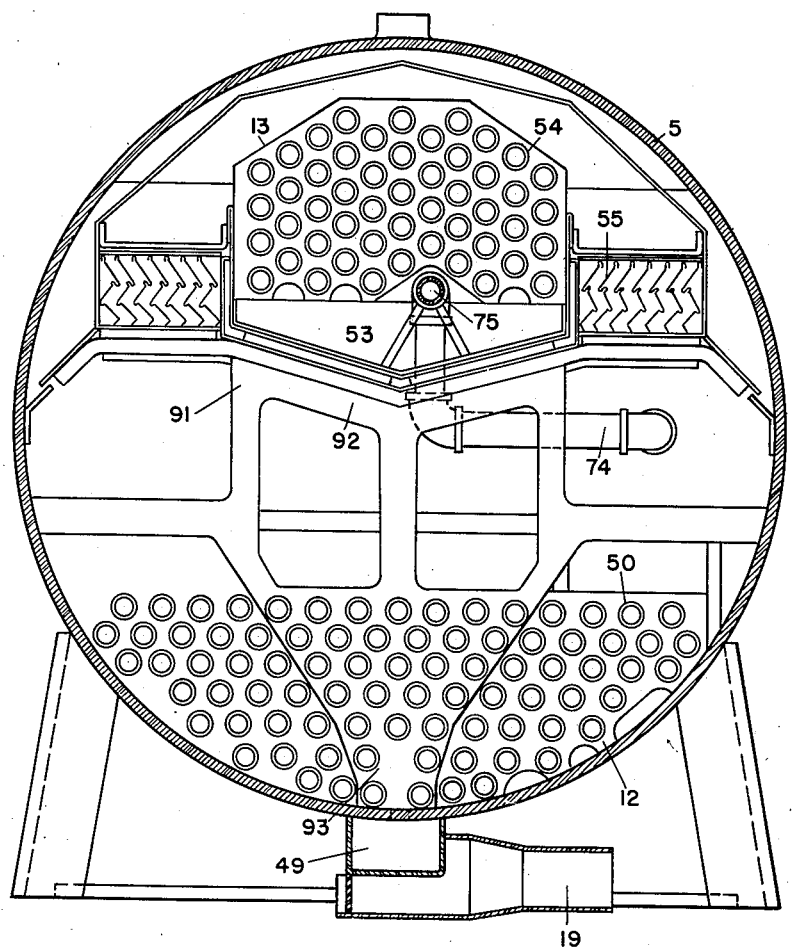

Patented Aug. 28, 1951

2,565,943

UNITED STATES PATENT OFFICE 2,565,943

ABSORPTION REFRIGERATION SYSTEM

Alexis A. Berestneff, Syracuse, N. Y., assignor to Carrier Corporation, Syracuse, N. Y., a corporation of Delaware Application July 13, 1946, Serial No. 683,387

15 Claims. (Cl. 62—5)

This invention relates to refrigeration systems and more particularly to an absorption refrigeration system adapted for use in air conditioning applications or in any application in which temperatures above the freezing temperature of water are desired. It will be understood the present invention may also be employed in low temperature refrigeration fields. In such cases, the system may be varied somewhat in minor details from the system used in air conditioning applications.

The chief object of the present invention is to provide an improved and economical absorption refrigeration system capable of more satisfactory performance and which may be manufactured at a cost considerably less than systems of such type heretofore contemplated.

An object of the invention is to provide a compact absorption refrigeration system requiring less floor area per ton of refrigeration capacity than systems heretofore provided.

A still further object is to provide a compact and economical absorption refrigeration system embodying a novel and efficient arrangement of the elements forming the system which assures increased efficiency of the system and reduces the space required for the system in use.

A still further object is to provide improved controls for an absorption refrigeration system.

A still further object is to provide an absorption refrigeration system including means for maintaining a desired level of solution in the generator.

A still further object is to provide an absorption refrigeration device so designed as to eliminate any necessity for external insulation.

A still further object is to provide a compact absorption refrigeration system possessing increased efficiency over structures heretofore known, which is capable of economical operation.

A still further object is to provide an absorption refrigeration system including a novel arrangement for supplying solution to the generator in such manner as to obviate an extensive preheating period.

A still further object is to provide improved purge means for purging the absorber and the condenser of non-condensible gases which have entered the system.

A still further object is to provide an absorption refrigeration system which includes a novel arrangement of absorber and evaporator which enhances the efficiency of the system.

A still further object is to provide an absorption refrigeration system which includes a novel arrangement of generator and condenser.

A still further object is to provide an absorption refrigeration system which is capable of ready operation even by one relatively unskilled in the operation of refrigeration systems. Other objects of my invention will be readily perceived from the following description.

This invention relates to an absorption refrigeration system comprising in combination a horizontally extending shell, an absorber arrangement disposed in said shell and extending longitudinally thereof, an evaporator arrangement in said shell above the absorber arrangement, a second horizontally extending shell placed above said first shell, a generator arrangement disposed in said shell and extending longitudinally thereof, a condenser disposed in said second shell above the generator arrangement, means for withdrawing solution from the generator and for forwarding the solution to the absorber, and means for circulating solution from the absorber to the generator. Refrigerant is forwarded to the evaporator, the refrigerant being flash cooled in the evaporator. The flashed vapor passes downwardly about the evaporator to the absorber to be absorbed by solution therein. In the generator substantially the same amount of vapor is boiled out, passed to the condenser, is condensed, and returned to the chilled water circuit. The rarefied vapor in the absorber-evaporator shell serves to insulate the evaporator from the ambient atmosphere. Control arrangements are provided for maintaining the capacity of and the concentration of solution in the system, as well as pressure, temperature of cooling water, and the flow of solution and of condensing water. A purge arrangement is provided to withdraw air or other non-condensible gases from the absorber and the condenser. A heat exchanger, preferably, is provided to place the strong and weak solutions in heat exchange relation with one another thereby decreasing the cost of operation of the system.

The attached drawings illustrate a preferred embodiment of my invention in which:

Figure 8 is a sectional view on the line 21—21 of Figure 6.

Figure 1:
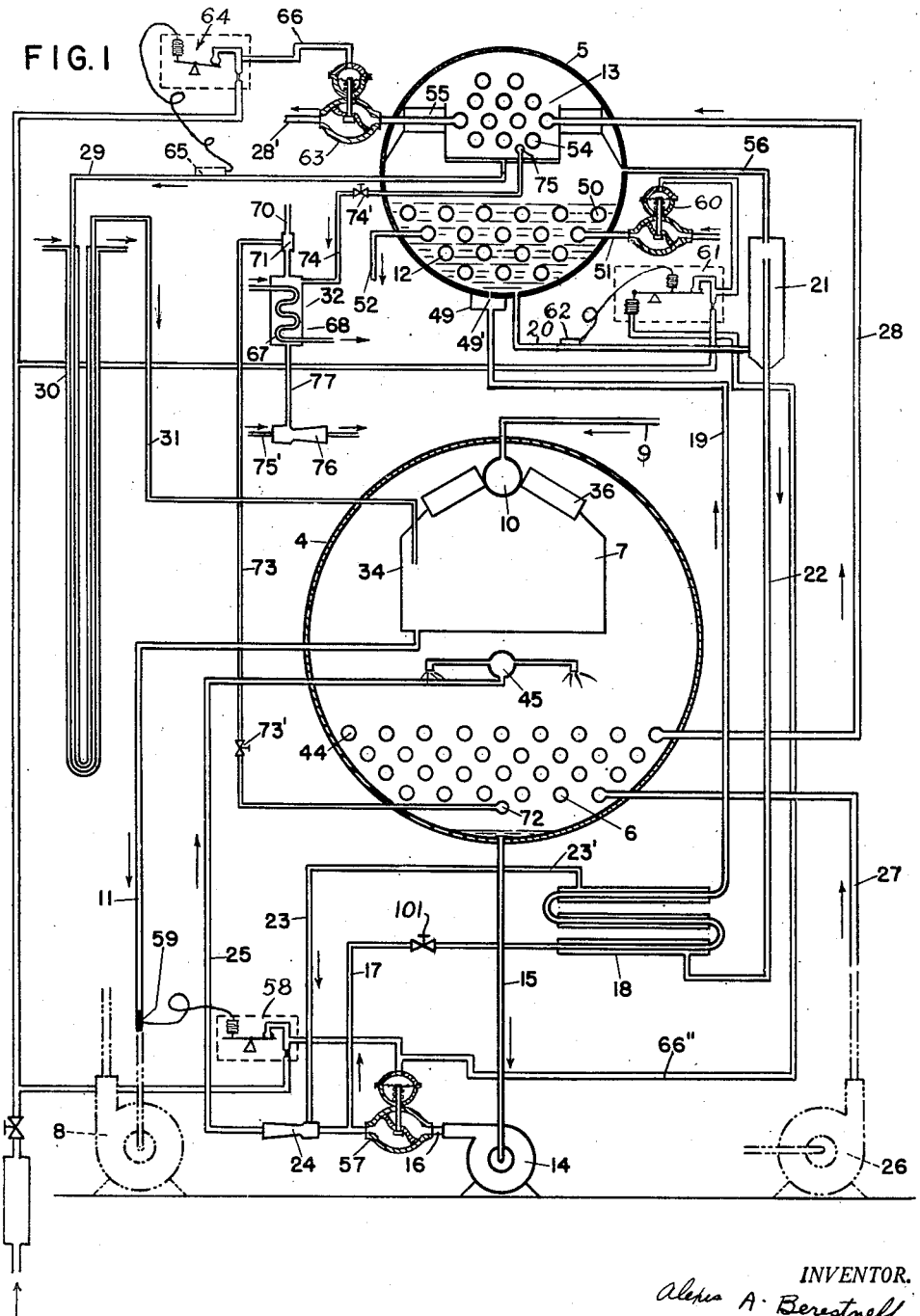
Figure 1 is a diagrammatic view illustrating the flow of solution through the various elements of the refrigeration system.
Figure 2:
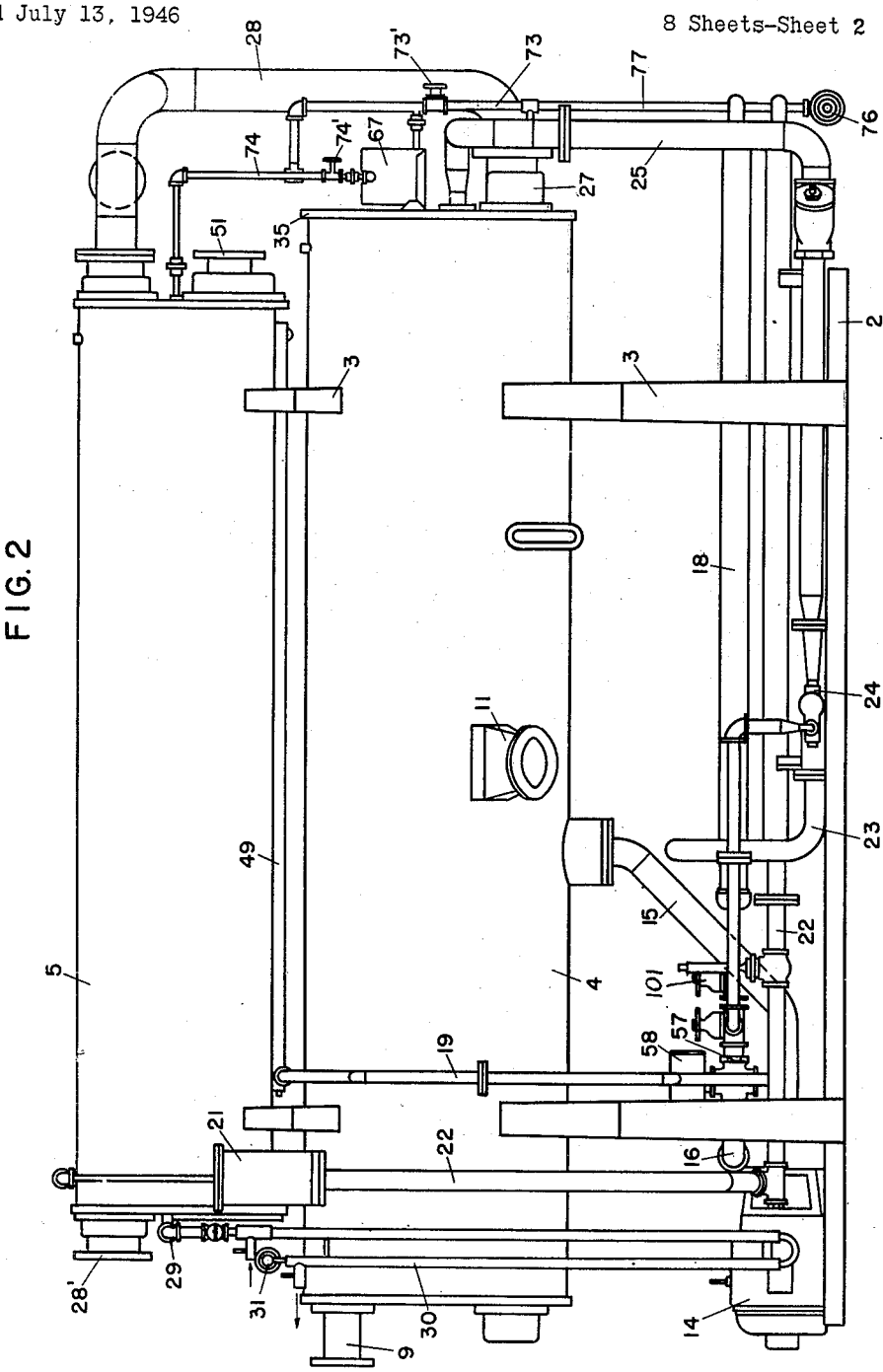
Figure 2 is a view in side elevation of the absorption refrigeration device of my invention.
Figure 3:
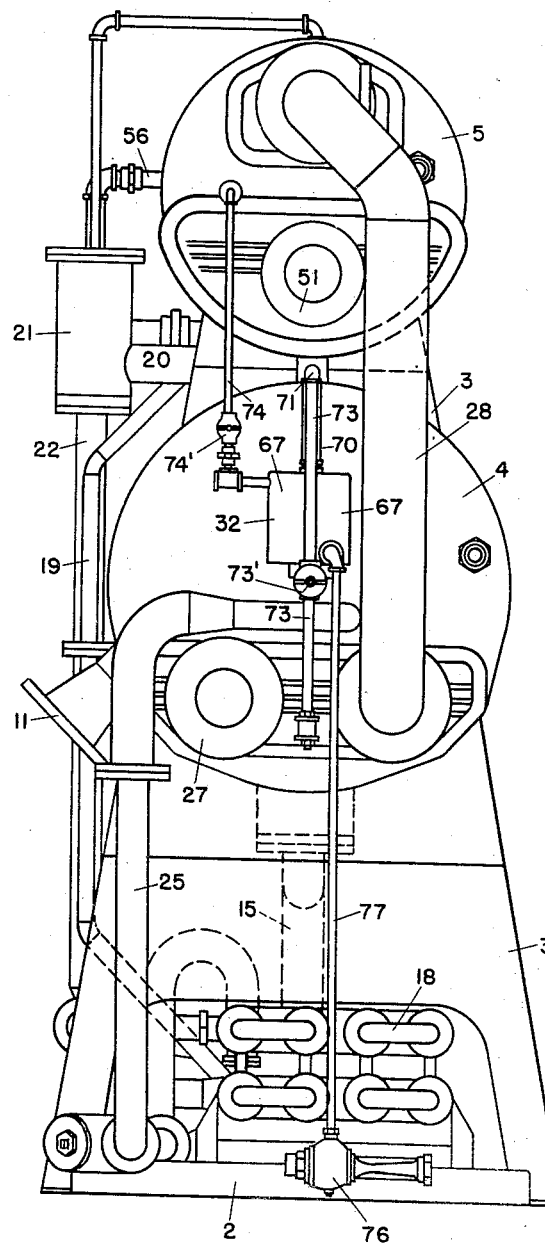
Figure 3 is a view in end elevation of the device shown in Figure 2.

Referring to the drawings, there is provided a framework including a base 2 and supports 3 secured to the base adapted to carry horizontally extending drums or shells 4 and 5. Shell 5 preferably is secured in place above shell 4. Shell 4 encloses a longitudinally extending absorber arrangement 6 and a longitudinally extending evaporator arrangement 7 disposed above the absorber 6. Chilled water treated by the system is circulated by a pump 8 through an air conditioning device of any desired type (not shown) and is returned from the air conditioning device to the evaporator 7 through line 9. The chilled water is sprayed in evaporator 7 by a suitable spray arrangement 10, the chilled water being flash cooled in the evaporator and being drawn from the evaporator through line 11 by pump 8 and again forwarded to the air conditioning device.

Shell 5 encloses a longitudinally extending generator arrangement 12 and a longitudinally extending condenser arrangement 13 disposed above the generator 12. Weak solution is withdrawn from absorber 6 by pump 14 through line 15 and is forwarded to the generator 12 through lines 16, 17, heat exchanger 18 and line 19. A restriction 101 may be disposed in line 17. Strong solution is withdrawn from generator 12 through line 20, overflow arrangement 21, line 22, heat exchanger 18 and line 23 to an ejector 24 which forwards strong solution through line 25 to the absorber 6. It will be noted line 23 is looped for a purpose hereinafter described. Such means are disposed in heat exchange relation by means of heat exchanger 18 hereinafter described. Solution overflow arrangement 21 serves to prevent solution in the generator 12 rising above or sinking below a predetermined level as hereinafter explained.

The term "weak solution" is used herein to define a solution containing a large amount of refrigerant so that the solution is weak in absorbing properties. The term "strong solution" defines a solution which is relatively deficient in refrigerant and consequently a solution which possesses enhanced properties of refrigerant absorption.

Various combinations of refrigerant and absorber may be used in the present system. I have found that a solution consisting of lithium bromide and water is highly satisfactory for use. Other salt solutions may be used if desired in the system; when the system is operated at high temperatures (above freezing temperature) a solution of lithium chloride and water or a solution of sodium hydroxide and water for example may be used. It will be understood when the present invention is used to attain low temperatures, ammonia, for example, may be used as a refrigerant.

A pump 26 passes cooling water through line 27 to the coil of the absorber 6 and then forwards the water after its passage through absorber 6 through line 28 to the coil of condenser 13; in some cases, if desired, the direction of flow may be reversed, the cooling water being directed first to the coil of the condenser 13 and then to the coil of the absorber 6. After passage through the coil of condenser 13, the water is discharged or, if desired, may be reused as in the case of a cooling tower. While I have described cooling water as passing in series through the coils of the absorber and condenser, it will be understood cooling water may be passed in parallel through such coils. If desired, of course, any suitable means may be provided to supply water for cooling purposes.

A line 29 is adapted to withdraw vapor condensate from condenser 13, the vapor condensate passing through a precooler assembly 30 and then being returned through line 31 to the evaporator 7. The condensate precooler 30 consists of a double pipe assembly in which a cooling medium is passed in heat exchange relation with the vapor condensate; precooler 30 is shaped in the form of a loop to maintain a secure liquid seal between the shells 4 and 5 thus permitting different pressures to be maintained in such shells without escape of vapor.

A suitable purge arrangement 32 is provided to purge condenser 13 and absorber 6 of air or other non-condensible gases. Purge 32 may operate intermittently or continuously as desired.

Figure 4:
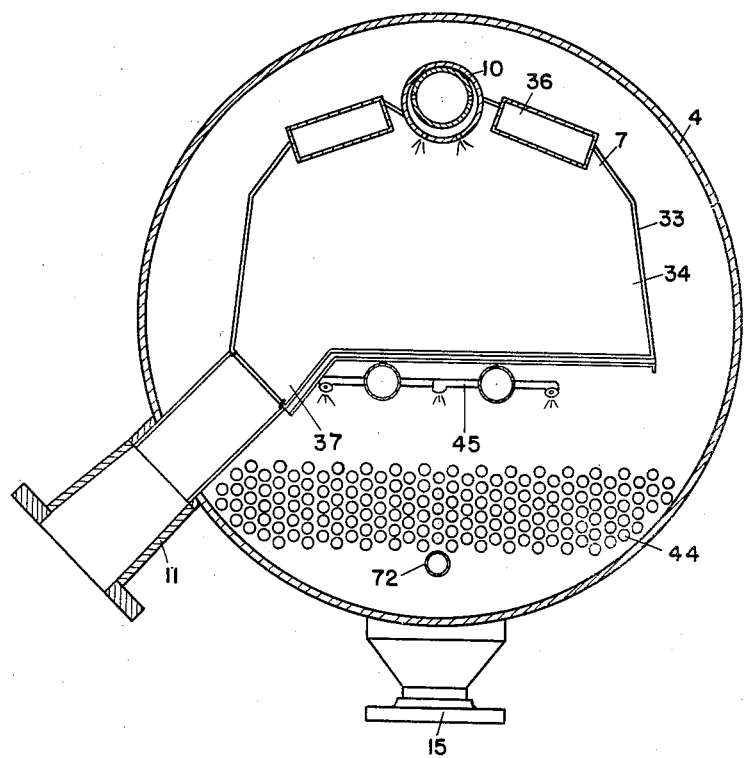
Figure 4 is a sectional view through the shell including the absorber and the evaporator.
Figure 5:
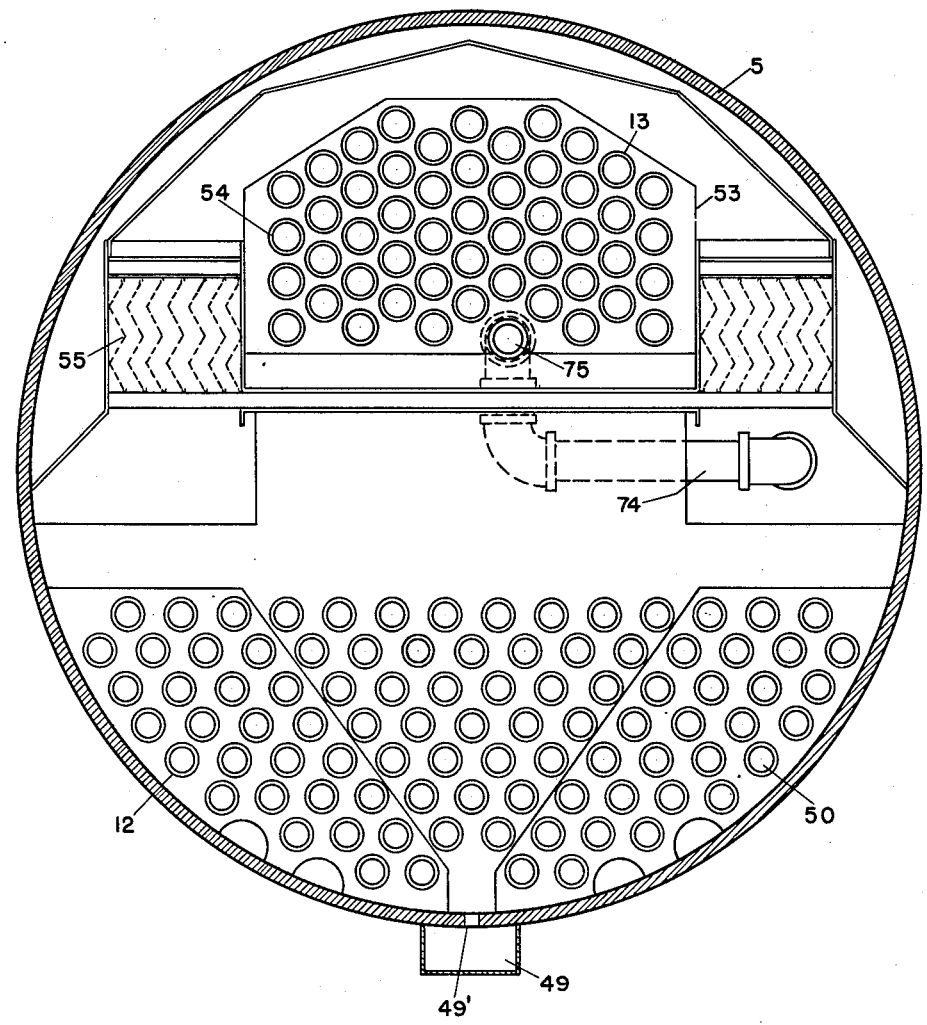
Figure 5 is a sectional view through the shell including the generator and the condenser.

Shell 4 contains absorber 6 and evaporator 7. The arrangement is shown in Figures 1 and 4. Evaporator 7 consists of horizontally extending side walls 33 and end walls (not shown) which serve to form a box-like compartment 34 supported at the end walls 35 of shell 4. Eliminators 36 are disposed adjacent the top of compartment 34 and extend longitudinally thereof. The eliminators 36 serve to prevent any drops of water entrained by the flashed vapor from being carried over to absorber 6 and return them to compartment 34.

Spray arrangement 10 is disposed between the eliminators 36 and receives refrigerant (chilled water or the like) returning from the air conditioning device and discharges it in compartment 34. A section 37 of compartment 34 is extended downward as shown in Figure 4; such arrangement permits the cooled water to be drained readily from compartment 34 through line 11 without requiring the maintenance of a high water level in compartment 34.

The absorber (refer to Figure 4) comprises a coil of tubes or pipes 44 which is arranged between the walls of shell 4 to permit downward flow of vapor passing between the tubes 44. The tubes 44 of absorber 6 preferably, are staggered as illustrated in Figure 4 in order to provide uniform distribution of sprayed liquid over the surfaces of the tubes. Preferably, tubes or pipes 44 are arranged in such manner as to form an isosceles or equilateral triangle with the larger axis of the corresponding rhombus extending horizontally. Such arrangement, as pointed out above, permits each vertical row of tubes 44 to receive a substantially equivalent amount of sprayed liquid which assures uniform distribution and complete wetting of the tube surfaces.

Spray arrangement 45 is used to spray strong solution over the tubes 44 of absorber 6.

The vapor formed by the flash cooling of refrigerant in evaporator 7 flows upwardly in evaporator 7, passes through eliminators 36 and then flows downwardly exteriorly of and surrounding compartment 34 and is absorbed by the strong solution sprayed over the tubes of the absorber. The strong solution sprayed over the tubes of the absorber is cooled by cooling water passing through tubes 44 of the absorber to aid in rapid absorption of the refrigerant. Preferably the tubes 44 are arranged some distance away from the lowest point of shell 4 in order to provide adequate space for storage of liquid in shell 4 in case of an increase in volume of solution.

As described above the generator 12 and condenser 13 are placed in shell 5 which is secured by the framework of the assembly in position above shell 4. Such arrangement of the condenser and the generator eliminates external vapor connections and increases the efficiency of the system. Shell 5 is provided with a longitudinally extending trough 49 into which the weak solution is passed. Openings 49' are provided in shell 5 at intervals to distribute weak solution uniformly throughout the length of generator 12. So distributing weak solution throughout the generator improves the efficiency of the device since inefficient reheating is eliminated. I have found that so distributing the weak solution at a plurality of points longitudinally of the horizontally extending generator decreases the preheating period over that required if all weak solution is passed into one end of the generator and permitted to flow longitudinally of the generator since there is an increase in heat transfer to the liquid due to turbulence. The generator is heated to evaporate the refrigerant from the weak solution by means of steam directed through the tubes 50 from steam line 51, the steam being withdrawn from tubes 50 through steam line 52.

Condenser 13 is disposed in position longitudinally of shell 5 above generator 12. Preferably, condenser 13 is placed freely on the supports to obviate disadvantages which might flow from unequal contraction and expansion of the supports. Condenser 13 consists of a longitudinally extending box-like tank or compartment 53 enclosing a coil formed of tubes 54. Cooling water is passed through the coil 54 from line 28 and is discharged therefrom through line 28'. Eliminators 55 are disposed along the sides of condenser 13 and serve to prevent entrainment of drops of liquid, which might be carried by vapor flowing from the generator 12 upwardly to condenser 13.

Figure 6:
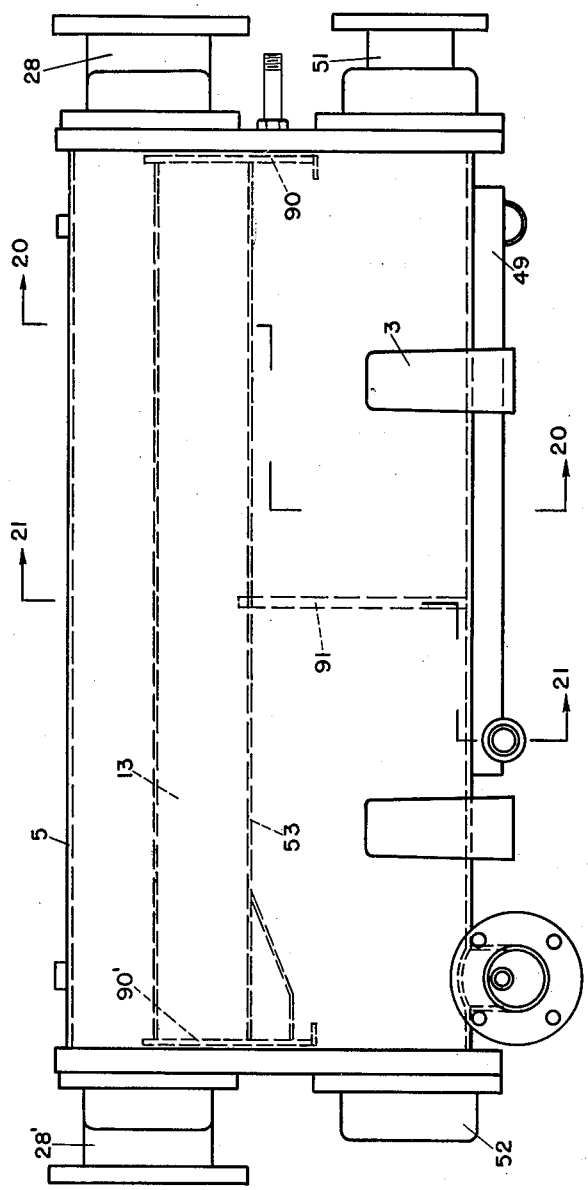
Figure 6 is a view in elevation showing the manner in which the condenser tank is disposed in the shell.
Figure 7:
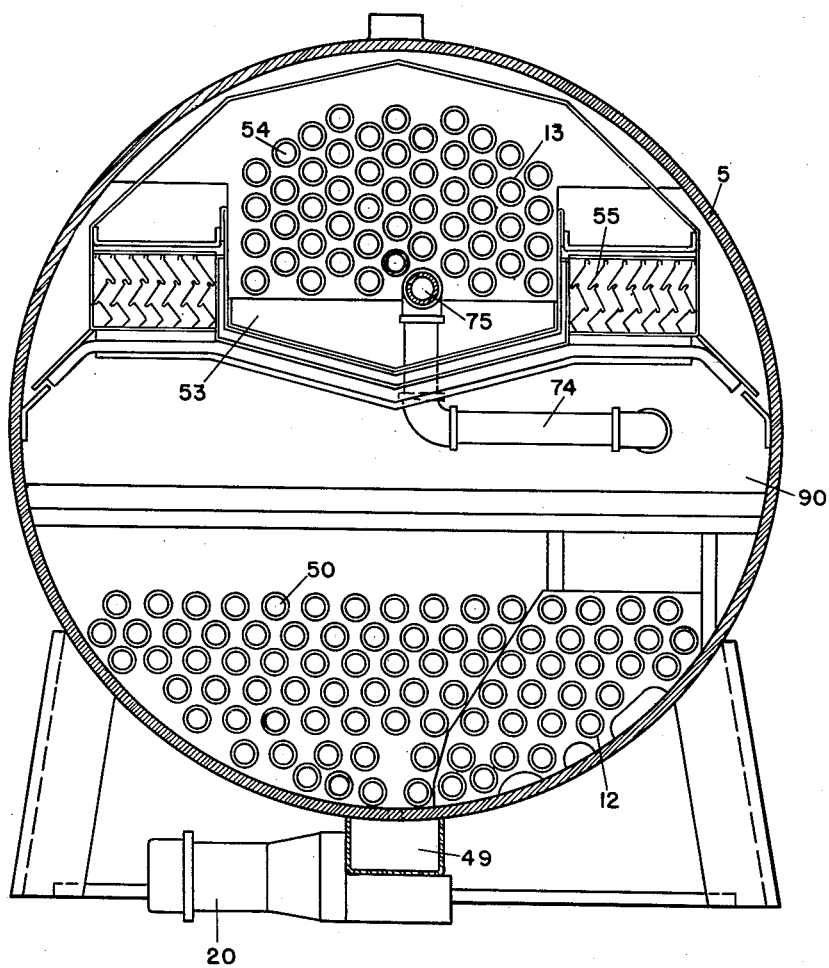
Figure 7 is a sectional view on the line 20—20 of Figure 6.

As described above, the condenser tank 53 is so supported in shell 5 as to permit independent contraction and expansion thereof. The condenser tank 53, baffles and eliminators 55 are formed as an independent unit which may be slipped freely within the shell 5 to rest on supports therein. As illustrated in Figures 6, 7 and 8, end plates 90 and 90' are welded to the ends of shell 5. Each end plate is shaped to conform to the contour of tank 53. At approximately the center longitudinally of shell 5 a support plate 91 is disposed which may be welded to the shell. Plate 91 is provided with an extended portion 92 shaped to the contour of tank 53 and is adapted to form a seat for tank 53. Plate 91 is also provided with an extended portion 93 which forms in effect a tube sheet adapted to support at least some of the tubes of the generator.

In assembling tank 53 with shell 5, tank 53 is slid within the shell and has one end thereof resting on end plate 90. The central longitudinal portion of tank 53 rests on and is supported by plate 91. The opposite end of tank 53 rests on the second end plate 90' and is supported thereby. It will be noted that tank 53 is not attached to its supports but is held in position thereby since the end plates conform to the contour of tank 53. Such method of assembly permits expansion and contraction of tank 53 independently of shell 5.

In the operation of the generator, weak solution is distributed therein at a plurality of points as described above. A portion of the refrigerant in the weak solution is boiled out and passes upwardly in shell 5 through eliminators 55 and is condensed in condenser 13, being removed from the condenser 13 through line 29 to condensate precooler 30 and then being returned to the evaporator 7; the strong solution remaining in generator 12 is withdrawn therefrom through line 20 as previously described.

To aid in preventing too high a liquid level in generator 12, line 56 is provided which leads to the overflow arrangement 21. When the liquid level in generator 12 rises, some portion of the liquid is drained through line 56 to overflow arrangement 21 which returns the solution through line 22, et cetera, to the absorber 6. The liquid level in the generator does not fall below the overflow level since the liquid is trapped in the generator.

It is desirable that the capacity be changed immediately upon change in load to attain most satisfactory operation. The temperature of the chilled water may be used to indicate a change in load since a decrease in the temperature thereof from a predetermined point indicates that the load imposed upon the system has decreased. As the temperature of the chilled water leaving the evaporator decreases, the capacity of the system may be decreased accordingly by throttling the volume of strong solution passing to the evaporator absorber.

For this purpose, a valve 57 is placed in line 16 between ejector 24 and pump 14, at a point between pump 14 and the juncture of line 17 with line 16 (refer to Figure 1). Valve 57 is actuated by a control 58 operated by a bulb 59 placed in or adjacent to line 11. As the temperature of chilled water passing through line 11 decreases, fluid in bulb 59 contracts and control 58 in accordance therewith tends to move valve 57 toward a closed position thereby decreasing the amount of weak solution being forwarded to generator 12 through lines 17 and 19 proportionately to the decrease in the temperature of the chilled water. Movement of valve 57 toward a closed position also decreases proportionately the amount of weak solution passing to ejector 24. The reduction in the amount of weak solution passing to ejector 24 reduces the velocity of such solution through the nozzle of the eductor and consequently a smaller quantity of strong solution is entrained or induced from line 23. The throttling action of valve 57 reduces the amount of solution passing to and returning from generator 12 and likewise reduces the amount of solution passing to ejector 24 and forwarded to the absorber 6. The capacity of absorber 6 is controlled by the decreased wetting action provided by the reduction in total solution and by the reduction in strong solution therein in accordance with the load imposed on the system.

A valve 60 is provided in steam line 51 to control the amount of steam passing into the tubes 50 of generator 12 in accordance with the load imposed upon the system. Valve 60 is actuated by control 61 operated in turn by a bulb 62 disposed in or adjacent to line 20. The amount of condensing water passing through condenser 13 is controlled by means of a valve 63 placed in line 28', actuated by a thermostat 64 controlled by a bulb 65 disposed in or adjacent to vapor condensate line 29. It will be understood valve 63 may be disposed in position in line 28 if desired; when cooling water is passed in series through the tubes of the absorber and the tubes of the condenser, valve 63 may be disposed in line 27 if desired. If cooling water is passed in parallel lines through the tubes of the absorber and the tubes of the condenser, a similar valve may be provided in the line supplying cooling water to the tubes of the absorber or in the line through which such water is withdrawn.

The concentration of the strong solution leaving generator 12 depends upon the temperature and pressure of solution in shell 5. Pressure in shell 5 may be maintained indirectly through the control of the condenser 13. The pressure in shell 5 is dependent upon the condensing temperature of the condenser 13. As the temperature of the vapor condensate in line 29 decreases it serves as an indication that too large an amount of condensing water is being permitted to flow through the coil 54 of condenser 13. Bulb 65 through thermostat 64 throttles valve 63 to decrease the amount of condensing water flowing through the coil 54 of condenser 13. The condensing temperature may be controlled by regulating the temperature of the cooling water within desired limits.

As the load reduces and the amount of solution passing from the generator reduces, the temperature of the strong solution in line 20 increases; the increase in temperature indicates that too much steam is being supplied to generator 12 heating the solution and increasing its concentration to an extent not required. Bulb 62 responding to the temperature of the solution in line 20 through control 61 actuates valve 60 to move toward a closed position to throttle the amount of steam passing through the coil 50 of generator 12 until it balances with the new load. By means of valves 60 and 63, temperature and pressure of the solution in shell 5 is controlled and thereby indirectly provides control of concentration of solution.

While generally it is desirable to maintain the concentration of the solution constant in accordance with temperature and pressure conditions in the shell 5, in some cases it may be desirable to decrease the concentration of the solution at partial load. For this purpose, a suitable reset control is provided to change the control point of control 61; control 61 may then be actuated by air pressure through a line (not shown) connected to air line 66 which operates valve 63 or preferably by air pressure through line 66" connected to the air line which operates valve 57. The reset control so provided serves to change the control point of control 61. As air pressure in line 66" decreases, it resets the control point of control 61 in accordance with the desired temperature of the solution leaving the generator and pressure in shell 5 thereby indirectly decreasing the concentration of the solution to the desired degree.

Purge arrangement 32 includes a housing or casing 67 containing a condensing coil 68 through which condensing water is passed. A steam line 70 is connected to housing 67 as shown in Figure 1 and an ejector 71 is disposed in line 70. A purge pipe 72 extends longitudinally of absorber 6 and has openings therein to suck in air and other non-condensible gases collecting in absorber 6. Pipe 72 is connected by means of line 73 to ejector 71. A valve 73' is disposed in the line to permit it to be closed when desired. Passage of steam through ejector 71 entrains air and other non-condensible gases from absorber 6 through line 73 when valve 73' is open; the steam and entrained gases are carried into housing 67 where a large part of the steam is condensed by its heat exchange relation with the water in coil 68.

Housing 67 is also connected by means of line 74 to a purge pipe 75 which extends longitudinally of condenser 13 and has openings therein to gather air and other non-condensible gases collecting in condenser 13. Pressure in housing 67 is less than pressure in shell 5. Consequently air and other non-condensible gases flow through line 74 to housing 67. A valve 74' is disposed in line 74 to permit it to be closed when desired. Likewise suitable valves (not shown) may be disposed in steam line 70 if desired and in water line 75 hereinafter described.

An auxiliary water line 75' is provided in which is placed a water ejector 76 connected to housing 67 by line 77. Passage of water through ejector 76 entrains the liquid and gases in housing 67 thus assuring their removal from the system. The steam and water used to actuate the purge may be obtained from the same sources of supply used to provide the generator with steam and the absorber and condenser with cooling water.

The purge arrangement described may operate either intermittently or continuously as desired; I have found that the absorption system described may be maintained in a condition substantially free from non-condensible gases by intermittent operation of the water ejector purge arrangement.

It will be noted the condenser 67 of purge arrangement 32 is disposed some distance above absorber 6. Such position of purge 32 is of particular value when, as occurs under some circumstances, the liquid level in absorber 6 rises above purge pipe 72. Ejector 71 is so disposed that under such conditions it cannot raise liquid to a height sufficient to withdraw solution from the system but is adequate to withdraw air and other non-condensible gases from absorber 6 when the liquid level in the absorber is such as to permit such gases to be withdrawn through purge pipe 72. Even though the liquid level in the absorber 6 is above pipe 72, operation of purge 32 does not remove liquid from the absorber. The purge arrangement so described is claimed in my Patent No. 2,520,027 of August 22, 1950 which matured from a division of this case.

It will be noted (refer to Figure 1) that line 23 has at least a portion thereof disposed in the form of a loop 23'. Ejector 24 is disposed in a plane below the plane in which heat exchanger 18 extends. Loop 23' serves to prevent the heat exchanger 18 from running dry during operation of the machine even when the liquid level in line 22 drops excessively. Loop 23' serves to assure that an adequate quantity of strong solution is present in exchanger 18 at all times for heat exchange purposes.

It is desirable for long life of service that elements of the device which come into contact with the brine solution be formed of or coated with corrosion inhibiting materials. If the elements contacted by the solution are not resistant thereto, it will be appreciated excessive downtime in long continued service may be encountered since it will be necessary to make frequent replacement of parts. Accordingly, in the preferred system, the elements which contact the solution are formed of corrosion inhibiting materials. For example the drums or shells may have their interior surfaces covered with stainless steel. The tubes of the absorber may be formed of cuprinickel while the tubes of the condenser may be formed of a suitable copper alloy such as Everdur. The evaporator and condenser tanks may be formed of copper alloys such as Everdur or brass. The eliminators may be formed of stainless steel or cuprinickel. Other elements of the system in contact with the brine solution may also be formed of cuprinickel or stainless steel.

My invention provides an improved absorption refrigeration system of increased efficiency and lower cost than systems of this type heretofore known. Such system provides adequate control of capacity, temperature of chilled water, flow and concentration of solution, flow of chilled water, flow of condensing water; control arrangements to permit suitable adjustment of the strength of the solution in accordance with the load imposed upon the system and to maintain a desired distribution of the liquid in the absorber and in the generator. A desired amount of weak solution is withdrawn from the absorber and combined with a proportionate amount of strong solution to be passed to the absorber in accordance with the load imposed upon the system.

An advantage of the present system resides in the division of weak solution to the generator and the absorber which serves to increase the performance and efficiency of the system. Arranging the absorber below the evaporator serves to concentrate non-condensible gases at the bottom of the absorber so that such non-condensible gases can be removed easily from the system through the purge arrangement. Another advantage is derived from positioning the absorber above the pumps and the generator above the ejector. Such arrangement provides additional head which decreases the capacity of pumps required for the system thereby decreasing operating costs.

This system is lighter in weight thus reducing shipping costs and permitting more ready and speedy assembly of the system for use. It does not contain any primary moving parts thus considerably increasing its serviceable life, does not vibrate in operation, and eliminates the dangers of extremely high pressures commonly maintained in absorption systems.

The spraying arrangement used for spraying water in the evaporator is so designed as to assure uniform distribution of water throughout the evaporator and a uniform distribution of spray in the evaporator without interference with flashed vapor arising from the evaporator. The spray arrangement used for spraying solution over the coil of the absorber assures an equal distribution of solution thereover thus improving the performance of the system.

The arrangement of the evaporator and absorber in a single shell enhances the economy and simplicity of the system. Vapor arising from the evaporator is directed to the absorber in such manner that it surrounds the exterior walls of the evaporator and in effect insulates the evaporator against the surrounding atmosphere. Additional insulation need not be disposed on the shell containing the evaporator in order to insulate the same, since the arrangement so provided is adequate to insulate the evaporator from the ambient atmosphere.

Various specific control arrangements illustrated are described and claimed in the copending application of Alexis A. Berestneff and William L. McGrath, Serial No. 683,390, filed July 13, 1946, entitled Refrigeration Systems.

While I have described and illustrated a preferred embodiment of my invention, it will be understood my invention is not limited thereto since it may be otherwise embodied within the scope of the following claims.

I claim:

1. In an absorption refrigeration system, the combination of a horizontally disposed shell, a member in said shell cooperating therewith to form an absorber, a second member in said shell cooperating therewith to form an evaporator serving to flash cool refrigerant, the flashed vapor passing to the absorber to be absorbed by the solution therein, a second shell disposed adjacent said first shell, a member in said second shell cooperating therewith to form a generator, a second member in the second shell cooperating therewith to form a condenser, the generator serving to vaporize refrigerant which is condensed in the condenser, a pump for withdrawing weak solution from the absorber and for forwarding the weak solution to the generator, an ejector, said pump serving to pass a portion of weak solution into the ejector, the discharge of weak solution in the ejector serving to entrain strong solution from the generator and to supply the mixture to the absorber.

2. In an absorption refrigeration system, the combination of a horizontally disposed shell, a member in said shell cooperating therewith to form an absorber, a second member in said shell cooperating therewith to form an evaporator serving to flash-cool refrigerant, the flashed vapor passing downwardly to the absorber to be absorbed by the solution therein, a second shell disposed above said first shell, a member in said second shell cooperating therewith to form a generator, a second member disposed in the second shell above the generator and cooperating with the second shell to form a condenser, the generator serving to vaporize refrigerant which passes upward and is condensed in the condenser, a line connecting the generator and the absorber, a pump disposed in said line adapted to withdraw weak solution from the absorber and to forward the weak solution to the generator, a second line connecting the absorber and the generator, an overflow arrangement disposed in said second line, and an ejector connected to said second line adapted to receive a stream of weak solution from said pump to entrain strong solution from said second line, the strong solution being forwarded to the absorber.

3. An absorption refrigeration system according to claim 2 in which a heat exchanger is provided adapted to place the strong and weak solutions in heat exchange relation to one another.

4. In an absorption refrigeration system, the combination of a horizontally extending shell, a member in said shell cooperating therewith to form an absorber, a second member in said shell cooperating therewith to form an evaporator serving to flash-cool refrigerant, the flashed vapor passing downward to the absorber to be absorbed by solution therein, a second horizontally extending shell disposed above said first shell, a member disposed in said second shell cooperating therewith to form a generator, a second member disposed in the second shell above the generator and cooperating with the second shell to form a condenser, the generator serving to vaporize refrigerant which passes upward and is condensed in the condenser, a line connecting the absorber and the generator, a second line connecting the generator and the absorber, a solution overflow arrangement disposed in said second line, a third line connecting the condenser and the evaporator adapted to return vapor condensate to the evaporator, means for purging the condenser and the absorber of non-condensible gases, and means for circulating solution from the absorber to the generator and from the generator to the absorber.

5. A system according to claim 4 in which control means are provided for controlling the circulation of solution through the system.

6. In an absorption refrigeration system, the combination of a horizontally disposed shell, a member in said shell cooperating therewith to form an absorber, a second member in said shell cooperating therewith to form an evaporator serving to flash-cool refrigerant, the flashed vapor being absorbed by the solution in the absorber, a second shell disposed adjacent said first shell, a member in said second shell cooperating therewith to form a generator, a second member in said second shell cooperating therewith to form a condenser, a pump adapted to circulate weak solution from the absorber to the generator, a line connecting the generator and the absorber, an ejector disposed in said line, said pump serving to discharge a portion of weak solution in said ejector thereby entraining strong solution from the generator and supplying it to the absorber, a solution overflow arrangement disposed in said second line, a second line connecting the condenser and the evaporator to return vapor condensate to the evaporator, and means for purging the condenser and the absorber of non-condensible gases.

7. In an absorption refrigeration system, the combination of an absorber, an evaporator, a horizontally extending shell, a member in said shell extending longitudinally thereof and cooperating therewith to form a generator, a second member in said shell extending longitudinally thereof above the absorber and cooperating with the shell to form a condenser, said shell including a trough-like portion to receive solution from the absorber and to distribute the solution among tubes of the generator, a line connecting the trough with the absorber, a line connecting the generator with the absorber, means for circulating solution between the generator and the absorber, said generator heating solution therein to vaporize refrigerant, the vaporized refrigerant passing upward to the condenser and being condensed therein, the strong solution being returned to the absorber, a line connecting the condenser and the evaporator to pass condensate to the evaporator, means for passing heating medium through tubes of the generator, means for passing cooling medium through tubes of the condenser, and means for removing non-condensible gases from the condenser.

8. In an absorption refrigeration system, the combination of a horizontally disposed shell having its interior formed of stainless steel, a member in said shell cooperating therewith to form an evaporator to flash-cool refrigerant, said evaporator being formed of a corrosion-inhibiting copper alloy, a second member in said shell cooperating therewith to form an absorber, said absorber including cuprinickel tubes, the flashed vapor being absorbed by the solution in the absorber, a second shell having its interior formed of stainless steel disposed adjacent the first shell, a generator in said shell having cuprinickel tubes, a condenser in said shell, said condenser including a tank and tubes of copper alloy, a pump disposed to circulate weak solution from the absorber to the generator, a line connecting the generator and the absorber, and an ejector in said line, said pump discharging a portion of weak solution in said ejector thereby entraining strong solution from the generator and supplying it to the absorber.

9. In an absorption refrigeration system, the combination of a shell, a member in said shell cooperating therewith to form a generator, means including a tank for the reception of condensate disposed in said shell and cooperating therewith to form a condenser, and means for supporting the condenser tank in said shell to permit contraction and expansion thereof independently of said shell, said support means including end members attached to said shell, said members being shaped to conform to the contour of said tank, and an intermediate support member shaped to conform to the contour of said tank, said support member being secured to said shell.

10. In an absorption refrigeration system, the combination of a shell, a member in said shell cooperating therewith to form a generator, a tank member in said shell cooperating therewith to form a condenser, said tank being adapted to receive condensate therein, a plurality of end support members attached to said shell, said members being shaped to conform to the contour of said tank, and an intermediate support member shaped to the contour of said tank, said intermediate support member being secured to said shell, said tank resting on said support members to permit contraction and expansion thereof independently of the expansion and contraction of said shell.

11. In an absorption refrigeration system, the combination of a shell, a member in said shell cooperating therewith to form an absorber, a second member in the shell disposed above the first member and cooperating with the shell to form an evaporator, said shell having a predetermined pressure maintained therein, a second shell disposed above the first shell, and an element in said second shell cooperating therewith to form a generator, a second element in said second shell disposed above the first element and cooperating with the second shell to form a condenser, said second shell having a predetermined pressure maintained therein different from the pressure in the first shell, the shells being sealed from one another and means for circulating solution between the shells.

12. In an absorption refrigeration system, the combination of a horizontally disposed shell, a member in said shell cooperating therewith to form an absorber, a second member in the shell cooperating therewith to form an evaporator, said second member being disposed above and spaced from the first member and serving to flash cool refrigerant, the flashed vapor passing to the absorber to be absorbed by solution therein; a second horizontally extended shell disposed above the first shell, an element in the second shell cooperating therewith to form a generator, a second element in said second shell cooperating therewith to form a condenser, said second element being disposed above and spaced from the first element, the generator serving to vaporize refrigerant which is condensed in the condenser, and means for circulating solution from the absorber to the generator and from the generator to the absorber.

13. An absorption refrigeration system according to claim 12 in which an overflow arrangement is provided to maintain a desired level of solution in the generator.

14. In an absorption refrigeration system, the combination of a generator, a condenser, a shell containing a first member cooperating therewith to form an absorber, a pan-like member in said shell cooperating therewith to form an evaporator, the evaporator being disposed above said absorber, said pan-like member extending longitudinally of the shell for substantially its length and being spaced from the interior wall of the shell to permit vapor flashed therein to pass downward to the absorber about the exterior of the pan-like member and between the interior wall of the shell and the pan-like member to insulate the pan-like member against ambient atmosphere, means for circulating solution between the absorber and the generator, means in said shell for spraying refrigerant in the evaporator to flash-cool the same, cooled refrigerant being withdrawn from the evaporator and placed in heat exchange relation with fluid to be cooled and means in said shell for spraying solution in the absorber.

15. In an absorption refrigeration system the combination of an absorber, an evaporator, a generator, and a condenser, the evaporator serving to flash cool refrigerant, the flashed vapor passing to the absorber to be absorbed by the solution therein, the generator serving to vaporize refrigerant which is condensed in the condenser, a pump for withdrawing weak solution from the absorber and for forwarding the weak solution to the generator, an ejector, said pump serving to pass a portion of weak solution into the ejector, the discharge of weak solution in the ejector serving to entrain strong solution from the generator and to supply the mixture to the absorber.

ALEXIS A. BERESTNEFF.

REFERENCES CITED

The following references are of record in the file of this patent:

UNITED STATES PATENTS

| Number | Name | Date |
|---|---|---|
| 1,289,613 | Bell | Dec. 31, 1918 |
| 1,455,701 | Altenkirch | May 15, 1923 |
| 1,532,399 | Gibbs | Apr. 7, 1925 |
| 1,972,001 | Witham et al. | Aug. 28, 1934 |
| 2,019,290 | Brace | Oct. 29, 1936 |
| 2,061,606 | Zellhoefer | Nov. 24, 1936 |
| 2,085,937 | Zellhoefer | July 6, 1937 |
| 2,099,201 | Getaz | Nov. 16, 1937 |
| 2,103,596 | Raigorodsky | Dec. 28, 1937 |
| 2,142,960 | Zellhoefer | Jan. 3, 1939 |
| 2,196,911 | Getaz | Apr. 9, 1940 |
| 2,277,429 | Fiene | Mar. 24, 1942 |
| 2,282,503 | Thomas et al. | May 12, 1942 |
| 2,298,924 | Bichowsky | Oct. 13, 1942 |
| 2,320,349 | Cropper | June 1, 1943 |
| 2,365,797 | Bichowsky | Dec. 26, 1944 |
| 2,378,177 | Bichowsky | June 12, 1945 |
| 2,408,480 | Reid | Oct. 1, 1946 |
| 2,430,047 | Edberg | Nov. 4, 1947 |